Jan. 11, 1955  M. E. WILKE  2,699,461

DEFERRED ACTION BATTERY

Filed Sept. 22, 1953

Inventor
Milton E. Wilke,
By Jones, Tesch & Darbo
Attys.

United States Patent Office 2,699,461
Patented Jan. 11, 1955

2,699,461

DEFERRED ACTION BATTERY

Milton E. Wilke, Freeport, Ill., assignor to Burgess Battery Company, Freeport, Ill., a corporation of Delaware Application September 22, 1953, Serial No. 381,699

10 Claims. (Cl. 136—111)

This invention relates to improvements in primary batteries and particularly to a deferred action primary battery in which the cells are of the flat type. More specifically it relates to the deferred type of battery which is adapted to be energized by being brought into contact with a body of activating liquid, as by being dipped or immersed in the body of activating liquid.

In deferred action batteries of the general character described, the cells are composed of two dissimilar electrodes with an electrolyte-receptive element between them, each cell element having one or more surfaces exposed to the surrounding space in such a manner that the cells comprising the battery may be activated simultaneously by being brought into contact with a common body of activating liquid. In this operation, the electrolyte-receptive element absorbs the activating liquid, and the difficulty has been encountered that some of the activating liquid tends to cling to the exposed surfaces of the electrodes and form bridges between the elements of different cells, as between the positive electrode of one cell and the adjacent negative electrode of the next cell. As a consequence, a local electrolytic action takes place between such eletrodes resulting in the consumption of the negative electrode. Short circuits also occur, and the net result is a dissipation of energy with an accompanying reduction of voltage and capacity of the battery.

It is an object of the invention to provide a construction for batteries of the type described in which such local action and short circuits are substantially eliminated.

A further object is to provide a battery of the character described in which the entire area of one surface of the metal negative electrode is exposed to the electrolyte and thereby utilized.

Another object is to provide a battery of the character described wherein the need for intercell connective devices is eliminated by providing each cell with terminals having broad exterior exposed surfaces, and placing the broad exterior surface of the positive terminal of one cell in direct contact with the broad exterior surface of the negative terminal of the adjacent cell, whereby an electrical juncture is created without the addition of separate connective devices and the assembly of the battery is rendered more simple and economical.

Another object is to provide a cell for a battery of the character described wherein the negative electrode is provided with an integral shield which separates such electrode from the positive electrode of the adjacent cell and thereby protects the negative electrode against the local action described hereinbefore, the shield being in the form of a thin layer or foil of a conductive metal which is not substantially electronegative to the positive electrode and being intimately joined mechanically and electrically to the surface of the negative electrode.

A further object is to provide an improved battery of the character described in which the structure is simple and economical.

Another object is to provide a battery structure and method of making the same which facilitates a rapid, economical and simple manufacture of the batteries.

Another object is to provide a battery structure and method of making the same which renders possible the economical manufacture of a wide variety of sizes of cells and batteries.

A further object is to provide an elongated primary cell blank which is adapted to be cut into length to form individual cells of the battery of the present invention.

Other objects and advantages will become apparent from the following description, which is to be taken in conjunction with the accompanying drawings, in which Fig. 1 is a sectional elevation on an enlarged scale of a portion of an embodiment of the battery of the invention;

Figure 1:
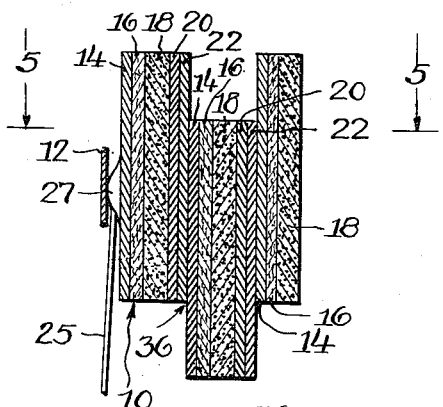
Figure 4:
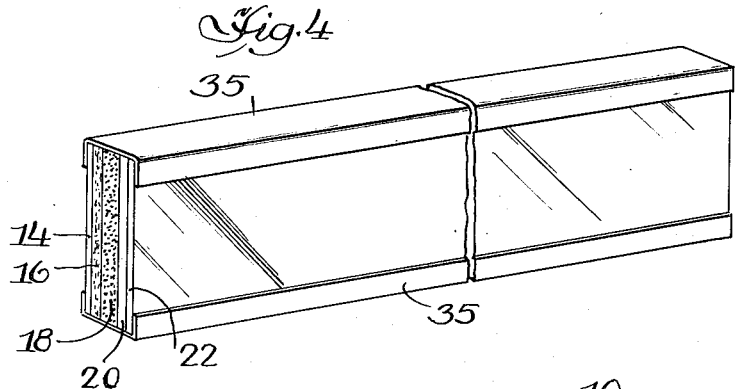
Figure 5:
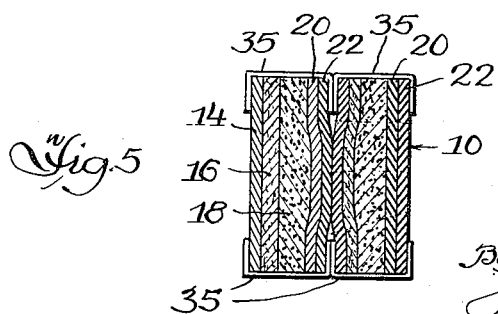

Fig. 4 is a perspective view of an elongated cell blank adapted to be cut into lengths to form a plurality of individual cells; and Fig. 5 is a sectional view along line 5—5 of Fig. 1 of two cells at one end of the battery, showing the manner in which the facing electrode members of contiguous cells are brought into conductive contact with one another when the cells are compressed together to form a battery.

Figure 2:
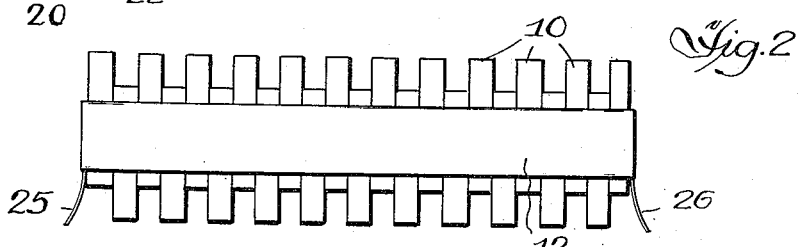
Fig. 2 is a side elevation of said embodiment.

The battery shown in Figs. 1, 2 and 5 is composed of a plurality of series-connected flat cells 10 arranged in face-to-face juxtaposed relationship, each cell being offset lengthwise thereof with respect to the cells adjacent thereto and the assembly of cells being held together under pressure by the encircling band or tape 12 or other suitable means.

Each cell 10 is composed of a plurality of juxtaposed thin, flat cell elements ararnged in sandwich-like relationship, said elements comprising, from left to right in Figs. 1 and 5, the positive terminal 14, the depolarizing cathode or positive electrode 16, the absorbent electrolyte-receptive element 18, the anode or negative electrode 20 and the conductive metal shield 22. The element 22 is composed of a conductive metal which is not substantially electronegative with respect to the positive electrode 16. It serves as a shield to protect the negative electrode against the formation of bridges of electrolyte between said electrode and the positive electrode of the adjacent cell. The shield 22 is in intimate mechanical and electrical union with the negative electrode throughout the area of the broad surfaces of said elements. The element 22 also serves as the negative terminal of the cell.

The intimate juncture of the elements 20 and 22 may be accomplished in any suitable manner, in practice the preferred method being the known pressure-welding procedure which is called cladding. Various cladding procedures are known, and the procedure will not be described herein. As a result of the cladding operation, the elements 20 and 22 are welded together throughout the area of their broad surfaces. Said elements are coextensive and in intimate electrical and mechanical association whereby they are at the same potential, and they will for convenience sometimes herein be referred to together as the negative electrode member.

In addition to serving as a positive terminal, element 14 serves to give strength and support to the positive electrode 16. The elements 14 and 16 are also coextensive with each other and in intimate electrical and mechanical association whereby they are at the same potential in the battery, and these two together will sometimes herein be referred to as the positive electrode member.

The specific composition of the various elements may be varied as is described hereinafter. By way of illustration and not of limitation, in a specific embodiment of the cell, the positive terminal 14 is composed of copper, the depolarizing cathode 16 is of cuprous chloride, the electrolyte-receptive element 18 is of absorbent paper such as blotting paper, the anode 20 is of magnesium, and the negative shield and terminal 22 is of copper. The broad exterior surfaces of the terminals 14 and 22 form the facing surfaces of each cell. In the drawing, the thickness of the elements is exaggerated, the elements 14 and 22 being of foil thickness. All of the elements are flexible and the element 18 is compressible.

Instead of the magnesium, cuprous chloride cell system described the magnesium, silver chloride cell system may be used in which the elements are of the following composition: 14 silver, 16 silver chloride, 18 absorbent paper, 20 magnesium, 22 silver or copper. Copper is not far removed from silver in the electromotive force series and may be used as the shield and terminal 22 in this last described system. Also, zinc may be used in place of magnesium in either of the described cells.

Each cell is enclosed on only two sides, these being the two long narrow sides which are opposite each other and which are made up of the edges of the cell elements. The short sides, which are made up of the short edges of the cell elements, and the cell faces are exposed to the surrounding space. For convenience the enclosed sides will be called the side edges of the cell and the exposed short sides will be called the ends of the cell. In the embodiment illustrated, the longest dimension of the cell is that extending from one open end to the other, and the axis extending in this direction is considered the longitudinal axis of the cell. The invention is not limited, however, to cells of such shape and said longitudinal dimension may be equal to or less than the other dimensions of the cell. Preferably, the cells of a battery are of substantially the same length.

In accordance with the present invention, the closure at the side edges is by means of a substantially electrolyte-impervious, flexible, dielectric material in the form of tape strips 35, as shown in Fig. 4, which may be composed of paper or cloth coated on the exterior surface and impregnated with lacquer, varnish, resin, or the like, and coated on the interior surface with a pressure-sensitive adhesive. The tape encloses and makes firm adhesive contact with the side edges of the cell elements and the marginal portions of the exterior surfaces of terminals 14 and 22, leaving the major portions of said surfaces exposed throughout their length. The resulting cell has two narrow sides covered by tape, and two broad faces and two ends exposed to the surrounding space. At each such end, the cell elements and the tape 35 are preferably caused to terminate in substantially the same plane, as shown. The exposed broad surfaces of the terminals 14 and 22 are the faces of the cell and are the means by which electrical connection is created between cells when the latter are assembled to form the battery.

In assembling the battery of series-connected cells, the cells are arranged in parallel juxtaposed relationship in a stack with the broad faces of each cell in face-to-face contacting relationship with the adjacent cells and with the open ends of the cells directed toward the same two opposite sides of the battery as shown in Figs. 1 and 2.

Each succeeding cell in the stack comprising the battery may be offset endwise thereof with respect to the cells adjacent thereto, the offset of each succeeding cell being in a direction opposite to that of the last to form a staggered succession of cells in which each succeeding cell projects endwise in the opposite direction from the last. The cells are all oriented similarly, that is, as the battery is viewed in Fig. 1, the positive terminals 14 are all at the left sides of the cells. The result is a staggered succession of cells by reason of which the open ends of each cell are spaced a substantial distance from the open ends of the adjacent cells as disclosed in United States Patent No. 2,637,756.

In accordance with the present invention, the cells are assembled as in Fig. 1 so that the broad facing surface of the positive terminal 14 of one cell is in firm pressure contact and electrical connection with the facing surface of the negative terminal of the adjacent cell throughout the major portions of the areas of said facing surfaces. Such a contact over a large area provides an effective low resistance inter-cell connection and eleminates the need for a separate connective element. Thus the broad surfaces of the positive and negative terminals of the cells being exposed throughout the length of the cells, provide the inter-cell connection through mere contact. A sufficient number of cells are juxtaposed or stacked together to provide the desired voltage at the terminals of the battery. The assembled battery is compressed longitudinally to bring the elements of the cells into suitable pressure engagement with each other and to bring the faces of dissimilar electrode members of adjacent cells into pressure conductive connection with each other.

The outside terminals of the end cells 10 are connected respectively to the battery terminals 25 and 26. This is accomplished by any suitable means, as the solder 27 shown in Fig. 1, and, if desired, the connecting juncture may be enclosed by the battery-encircling tape 12. Although it is not necessary to enclose said soldered juncture it serves a dual purpose, namely, protects the soldered juncture and also provides an additional point of concentration of pressure in the method of assemblage of the battery.

As is illustrated in Fig. 5, the thin cell elements are flexible and the absorbent paper 18 is compressible, and, under the compression exerted upon the battery stack as described hereinbefore, the elements bend and compress to accommodate the thicknesses of the edge enclosing tape 35 at the marginal portions of the faces of the terminals 14 and 22, and the exposed portions of said faces are brought into pressure conductive contact with each other throughout the major portions of their lengths and widths. This enlarged surface contact provides the advantages of a low resistance connection and simplicity of manufacture in that a separate connector is unnecessary.

By the means described, the cells of the battery are connected in series and a relatively high voltage battery results. The output voltage is caused to have the value desired by regulating the number of cells, the number shown in Fig. 2 being arbitrary and not necessarily the actual number used in any case. The battery is initially manufactured in the electrolyte-free condition and the introduction of the activating liquid is delayed until it is desired to place the battery in service. It is then rendered operative by placing the open ends of the cells in contact with a suitable activating liquid, which may be plain water, the salt water of the sea, or a dilute aqueous solution of a suitable salt, an example being a solution of sodium chloride containing up to about 5% of NaCl based on the weight of the solution. The activating liquid may be introduced in any suitable manner as by introducing a small quantity into the open ends of the cells, but preferably it is introduced by momentarily contacting the open ends of the cells with a body of the liquid or by immersing the battery in such body. The liquid is absorbed by the electrolyte-receptive elements 18 and becomes the electrolyte of the cells, and the battery is thereby rendered operative.

In known deferred action batteries in which the cells are in substantial alignment in the longitudinal direction of the battery, and the open cell ends are not spaced apart, the activating liquid clings to the surfaces at the open cell ends and forms bridges between adjacent cells. Such bridges are conductive and constitute short circuits between the cells. In addition, they constitute bodies of electrolyte in which the positive and negative electrodes of adjacent cells normally assume different potentials, with the result that local electrolytic action takes place at the negative electrodes which causes a dissipation of the energy of the battery. Flat batteries of the character described are usually small and it is highly desirable that full voltage and energy be obtained.

In the battery of the present invention, the open ends of the cells of each pair of adjacent cells are effectively shielded from each other so that bridges of activating liquid are not formed between them and there is no substantial loss of voltage or energy. In accordance with the invention, such shielding is accomplished by the interposition of the element 22 between the positive and negative electrodes of adjacent cells. The element 22 has the inherent property of assuming in the activating liquid substantially the same electrode potential as does the cathode 16 of the adjacent cell and there is no local action between these elements. In other words, the element 22 is not substantially electronegative with respect to the positive electrode 16. At the same time, the element 22 completely covers the surface of the anode 20, which faces the cathode of the adjacent cell, whereby electrolyte bridges are not formed between such anode and cathode and whereby local action between the anode and the adjacent cathode is minimized or prevented. In addition, there may be a tendency for activating liquid to creep between the anode and cathode of adjacent cells, and in the battery of the present invention such creepage is between the positive terminal 14 of one cell and the negative terminal 22 of the other cell, which terminals assume the same electrode potential whereby no local action will result. The location of such creepage is indicated by the arrow 36 is Figs. 1 and 3.

In accordance with the present invention the cell elements are first assembled into an elongated cell blank and this is cut transversely into lengths to form the individual cells. The elongated blank is shown in Fig. 4. This consists of an assemblage of a plurality of elongated, thin, ribbon-like cell elements in a sandwich-like arrangement. It is formed by bringing together continuous strips of the ribbon-like elements into the sandwich arrangement, pressing them together and while so pressed together folding continuous strips of the adhesive-coated tape 35 about the elongated edges of the sandwich and the marginal portions of the facing elements, and pressing the tape in position, the operations being carried out progressively and continuously by suitable mechanism. The tape is adhesively joined with and encloses the edges of the cell elements and the marginal portions of the exterior faces of the elements 14 and 22, leaving the major portions of said faces exposed throughout their length.

The individual cells are formed by cutting the elongated blank into the desired lengths. The simplicity and economy of fabricating individual cells from an elongated blank in the manner described makes possible the easy and economical manufacture of a wide variety of cell sizes for different battery requirements.

Figure 3:
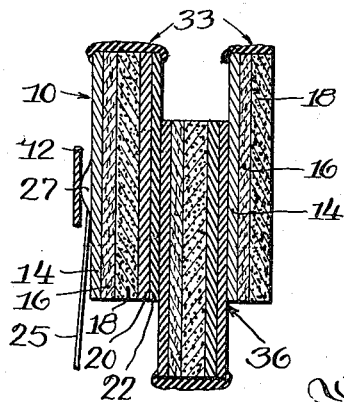
Fig. 3 is a view similar to Fig. 1 of a different embodiment wherein one end of each cell is sealed.

The embodiment illustrated in Fig. 3 is generally similar to that shown in Fig. 1 with the difference that the ends of the cells which project beyond the ends of the adjacent cells are sealed with an adherent body or cap 33 of fusible sealing composition such as wax or pitch. The seals 33 may be formed by momentarily dipping the sides of the battery to a slight depth in a bath of molten sealing composition and allowing the composition to cool and solidify. Except for the seals 33, the battery of Fig. 3 is similar to that of Fig. 1 and the description will not be repeated. A battery having cells offset and having one end of each cell sealed as in Fig. 3 is the subject of United States Patent No. 2,637,757.

The structure of the present invention is a substantial improvement over prior structures in the prevention of energy-dissipative local action caused by bridging of activating liquid between dissimilar electrodes of different cells.

While several embodiments of the invention have been described and illustrated, the invention is not limited thereto and modification and changes may be made as will occur to those skilled in the art. As stated heretofore, the composition of the various cell elements is not important and other systems than that specifically described may be used as desired.

Invention is claimed as follows:

1. A primary battery adapted for energization by contact with a body of activating liquid, comprising a plurality of electrically connected flat cells, each cell comprising a plurality of flat cell elements including a positive electrode and a negative electrode and an electrolyte-receptive element between said electrodes, one of said electrodes having throughout its area a covering upon and in intimate mechanical and electrical union with its exterior broad surface of a conductive substance which in said activating liquid assumes substantially the same electrode potential as does the other electrode, said conductive covering and said other electrode forming the faces of said cell, in each said cell a substantially electrolyte-impervious dielectric covering upon only two opposite side edges of the cell and leaving exposed the remaining edges of the cell and substantial portions of said faces throughout their length, the exposed facing surface of said conductive covering for the electrode of one cell being in direct pressure conductive contact with the exposed facing surface of said other electrode of the adjacent cell whereby said cells are electrically connected together, said arrangement inhibiting local action at the negative electrodes and bridging of electrolyte between the positive electrode of one cell and the negative electrode of the adjacent cell.

2. A primary battery adapted for energization by contact with a body of activating liquid, comprising a plurality of electrically connected flat cells, each cell comprising a plurality of flat cell elements including a positive electrode member and a negative electrode and an electrolyte-receptive element between said electrode and said electrode member, said negative electrode having throughout its area a covering upon and in intimate electrical and mechanical union with its exterior broad surface of a conductive substance which is not substantially electronegative with respect to said positive electrode member, said conductive covering being coextensive with said broad surface of said negative electrode and said covering and said positive electrode member forming the faces of said cell, in each said cell a substantially electrolyte-impervious flexible dielectric covering in the form of strips upon only two opposite side edges and the marginal portions of said faces and leaving exposed the remaining edges of the cell and the major portions of said faces, the exposed facing surface of said conductive covering for the negative electrode of one cell being in pressure conductive contact with the exposed facing surface of said positive electrode member of the adjacent cell whereby said cells are electrically connected together, said arrangement inhibiting local action at the negative electrodes and bridging of electrolyte between the positive electrode of one cell and the negative electrode of the adjacent cell.

3. A battery as claimed in claim 2 in which said strips are adhesively joined to the marginal portions of the faces of the cells.

4. A battery as claimed in claim 2 in which the flat cell elements are flexible and at least one element of each cell is compressible and in the assembled battery said elements undergo bending and compression to accommodate the thicknesses of the edge enclosing strips between adjacent cells and maintain firm pressure between the conductive contacting surfaces of adjacent cells.

5. A primary battery adapted for energization by contact with a body of activating liquid, comprising a plurality of electrically connected flat cells, each cell comprising a plurality of flat cell elements including a positive electrode member, a negative electrode and an electrolyte-receptive element between said electrode and said electrode member, said negative electrode having upon its exterior broad surface a cladding of a conductive metal which is not substantially electronegative with respect to said positive electrode member, said cladding element and said positive electrode member having broad surfaces forming the faces of said cell, in each said cell a substantially electrolyte-impervious dielectric covering in the form of strips upon only two opposite side edges of the cell and embracing the marginal portions of the exposed facing surfaces of the positive electrode member and the cladding element and leaving exposed the remaining edges of the cell and the major portions of said facing surfaces throughout the lengths of said positive electrode member and said cladding element respectively, the exposed facing surface of the cladding element of one cell being in direct pressure conductive contact with the exposed facing surface of the said positive electrode member of the adjacent cell whereby said cells are electrically connected together, said cells being generally parallel to each other and the exposed edges of said cells being disposed toward the same two opposite sides of said battery, each cell being offset endwise thereof with respect to the cell next adjacent thereto, the offset of each succeeding cell being in a direction opposite to that of the last cell to form a staggered succession of cells in which each succeeding cell projects endwise in the opposite direction from the last, said arrangement inhibiting local action at the negative electrodes and bridging of electrolyte between the positive electrode of one cell and the negative electrode of the adjacent cell.

6. A primary battery adapted for energization by contact with a body of activating liquid, comprising a plurality of electrically connected flat cells, each cell comprising a plurality of flat cell elements including a positive electrode member, a negative electrode and an electrolyte-receptive element between said electrode and said electrode member, said negative electrode having upon its exterior broad surface a cladding of a conductive metal which is not substantially electronegative with respect to said positive electrode member, said cladding element and said positive electrode member having broad surfaces forming the faces of said cell, in each said cell a substantially electrolyte-impervious dielectric covering in the form of strips upon only two opposite side edges of the cell and embracing the marginal portions of the exposed facing surfaces of the positive electrode member and the cladding element and leaving exposed the remaining edges of the cell and the major portions of said facing surfaces throughout the lengths of said positive electrode member and said cladding element respectively, the exposed facing surface of the cladding element of one cell being in direct pressure conductive contact with the exposed facing surface of the said positive electrode member of the adjacent cell whereby said cells are electrically connected together, said cells being generally parallel to each other and the exposed edges of said cells being disposed toward the same two opposite sides of said battery, each cell being offset endwise thereof with respect to the cell next adjacent thereto, the offset of each succeeding cell being in a direction opposite to that of the last cell to form a staggered succession of cells in which each succeeding cell projects endwise in the opposite direction from the last, closures upon the projecting ends of said cells of an adherent sealing composition, and the ends of said cells opposite the projecting ends thereof being open to the surrounding space for contacting a body of activating liquid, said arrangement inhibiting local action at the negative electrodes and bridging of electrolyte between the positive electrode of one cell and the negative electrode of the adjacent cell.

7. A primary flat cell adapted for energization by contact with an activating liquid, comprising a plurality of thin flat cell elements stacked in sandwich-like arrangement including a positive electrode and a negative electrode and an electrolyte-receptive element between said electrodes, said negative electrode having throughout its area a covering upon and in intimate electrical and mechanical association with its exterior broad surface of a conductive substance which is not substantially electronegative with respect to said positive electrode, said conductive covering and said positive electrode having broad surfaces forming the exterior faces of said cell, an electrolyte-impervious, dielectric covering upon each of two opposite edges and the marginal portions of the faces of said cell to leave exposed the remaining two edges and the major portions of the exposed faces of said cell, said arrangement inhibiting local action at the negative electrodes and bridging of electrolyte between the positive electrode of one cell and the negative electrode of the adjacent cell.

8. A primary flat cell adapted for energization by contact with an activating liquid, comprising a plurality of thin flat cell elements stacked in sandwich-like arrangement including a positive electrode and a negative electrode and an electrolyte-receptive element between said electrodes, said negative electrode being clad upon its exterior broad surface with a conductive metal which is not substantially electronegative with respect to said positive electrode, said cladding element and said positive electrode having broad surfaces forming the exterior faces of said cell, an electrolyte-impervious dielectric covering upon each of two opposite edges and the marginal portions of the faces of said cell to leave exposed the remaining two edges and the intermediate portions of said faces throughout their length.

9. A cell blank in elongated strip form adapted to be severed transversely into individual cells, comprising a sandwich-like arrangement of elongated, flat, ribbon-like cell elements including a positive electrode element, a negative electrode element and an electrolyte-receptive element between and in contact with said electrode elements, said negative electrode element being clad upon its exterior surface with a conductive metal which is not substantially electronegative with respect to said positive electrode element, said cell elements being continuous and uniform throughout their lengths and the exterior surfaces of said cladding element and said positive electrode forming the broad faces of said blank, and a pair of non-conductive, electrolyte-impervious coverings in adhesive engagement respectively with the two elongated edges of the blank and the marginal portions only of said faces of said blank to leave exposed the intermediate portions of said faces throughout their lengths.

10. A primary battery adapted for energization by contact with a body of activating liquid, comprising a plurality of electrically connected flat cells, each cell comprising a plurality of flat cell elements including a positive electrode member and a negative electrode and an electrolyte-receptive element between said electrode and said electrode member, said negative electrode having throughout its area a covering upon and in intimate electrical and mechanical union with its exterior broad surface of a conductive substance which is not substantially electronegative with respect to said positive electrode member, said covering and said positive electrode member forming the faces of said cell, in each said cell a substantially electrolyte-impervious flexible dielectric covering upon only two opposite side edges of the cell and leaving exposed the remaining edges of the cell and substantial portions of said faces, the exposed facing surface of said conductive covering for the negative electrode of one cell being in pressure conductive contact with the exposed facing surface of said positive electrode member of the adjacent cell whereby said cells are electrically connected together, said arrangement inhibiting local action at the negative electrodes and bridging of electrolyte between the positive electrode of one cell and the negative electrode of the adjacent cell.

References Cited in the file of this patent

UNITED STATES PATENTS

| Number | Name | Date |
|---|---|---|
| 2,272,969 | French | Feb. 10, 1942 |
| 2,637,756 | Coleman et al. | May 5, 1953 |
| 2,637,757 | Wilke | May 5, 1953 |
| 2,655,551 | Ellis | Oct. 13, 1953 |
| 2,684,395 | Chubb | July 20, 1954 |
| 2,684,481 | Chubb | July 20, 1954 |